(12) United States Patent
Masson

(10) Patent No.: US 10,516,150 B2
(45) Date of Patent: Dec. 24, 2019

(54) METHOD FOR PRODUCING AN ELECTROCHEMICAL BUNDLE FOR A METAL-ION ACCUMULATOR COMPRISING FOLDING OR COILING THE FOIL ENDS AROUND THEMSELVES

(71) Applicant: COMMISSARIAT A L'ENERGIE ATOMIQUE ET AUX ENERGIES ALTERNATIVES, Paris (FR)

(72) Inventor: Olivier Masson, Sassenage (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 103 days.

(21) Appl. No.: 15/738,830

(22) PCT Filed: Jun. 21, 2016

(86) PCT No.: PCT/EP2016/064301
§ 371 (c)(1),
(2) Date: Dec. 21, 2017

(87) PCT Pub. No.: WO2016/207154
PCT Pub. Date: Dec. 29, 2016

(65) Prior Publication Data
US 2018/0190962 A1    Jul. 5, 2018

(30) Foreign Application Priority Data

Jun. 22, 2015 (FR) ..................... 15 55695

(51) Int. Cl.
*H01M 2/26* (2006.01)
*H01M 4/485* (2010.01)
(Continued)

(52) U.S. Cl.
CPC .......... *H01M 2/263* (2013.01); *H01M 4/485* (2013.01); *H01M 4/505* (2013.01); *H01M 4/525* (2013.01);
(Continued)

(58) Field of Classification Search
CPC ............. H01M 2/263; H01M 10/0587; H01M 10/0525; H01M 10/052
See application file for complete search history.

(56) References Cited

U.S. PATENT DOCUMENTS 3,761,314 A     9/1973  Cailley
6,818,025 B1 *  11/2004 Ura ....................... H01M 2/263
                                                     29/623.1
(Continued)

FOREIGN PATENT DOCUMENTS

EP       1 102 337 A1    5/2001
EP       1 596 449 A2   11/2005
(Continued)

OTHER PUBLICATIONS

International Search Report dated Sep. 16, 2016, in PCT/EP2016/064301 filed Jun. 21, 2016.
(Continued)

*Primary Examiner* — Stewart A Fraser
(74) *Attorney, Agent, or Firm* — Oblon, McClelland, Maier & Neustadt, L.L.P.

(57) ABSTRACT

The invention relates to a method for producing an electromechanical bundle for a metal-ion battery, for electrical connection thereof to the output terminals of the battery, characterised by coiling or folding the sides of at least one of the two electrodes on itself, then compacting by packing in order to further increase the density of the coiled sides in order to weld the electrode to a current collector.

10 Claims, 4 Drawing Sheets

(51) Int. Cl.
*H01M 4/505* (2010.01)
*H01M 4/525* (2010.01)
*H01M 10/052* (2010.01)
*H01M 10/0525* (2010.01)
*H01M 10/0587* (2010.01)

(52) U.S. Cl.
CPC ..... *H01M 10/052* (2013.01); *H01M 10/0525* (2013.01); *H01M 10/0587* (2013.01)

(56) References Cited

U.S. PATENT DOCUMENTS

| | | |
|---|---|---|
| 7,335,448 B2 | 2/2008 | Kaito et al. |
| 7,338,733 B2 | 3/2008 | Morita et al. |
| 7,348,098 B2 | 3/2008 | Hayashi et al. |
| 8,007,549 B2 * | 8/2011 | Ligeois .............. H01M 2/263 29/623.1 |
| 2004/0237290 A1 | 12/2004 | Ura |
| 2005/0008933 A1 | 1/2005 | Ligeois et al. |
| 2006/0121348 A1 | 6/2006 | Mizutani et al. |
| 2006/0240323 A1 * | 10/2006 | Tomihara ............ H01M 2/22 429/211 |
| 2008/0057392 A1 | 3/2008 | Takamatsu et al. |
| 2008/0060189 A1 | 3/2008 | Daidoji et al. |
| 2009/0139082 A1 | 6/2009 | Ligeois et al. |
| 2016/0226056 A1 | 8/2016 | Masson et al. |
| 2018/0175359 A1 * | 6/2018 | Masson ............... H01M 2/26 |

FOREIGN PATENT DOCUMENTS

| | | |
|---|---|---|
| FR | 2.094.491 A5 | 2/1972 |
| FR | 2 853 764 A1 | 10/2004 |
| FR | 3 011 128 A1 | 3/2015 |
| WO | 2015/030541 A1 | 3/2015 |

OTHER PUBLICATIONS

French Search Report dated Apr. 28, 2016 in French Application 1555695 filed Jun. 22, 2015.

* cited by examiner

Fig.1
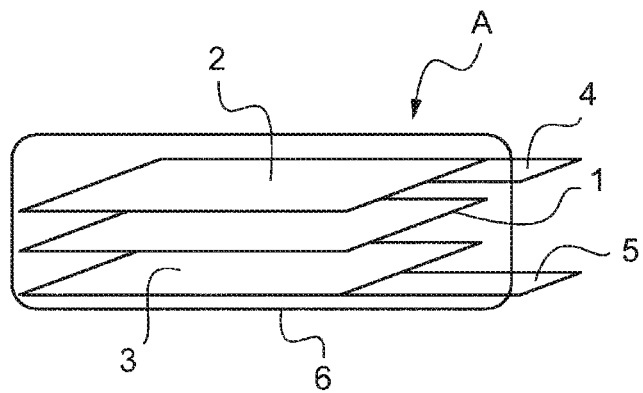
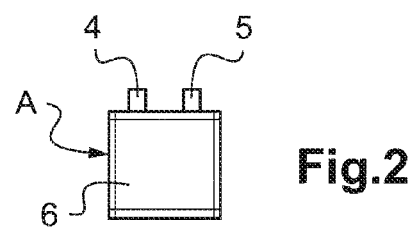
Fig.2
Fig.3
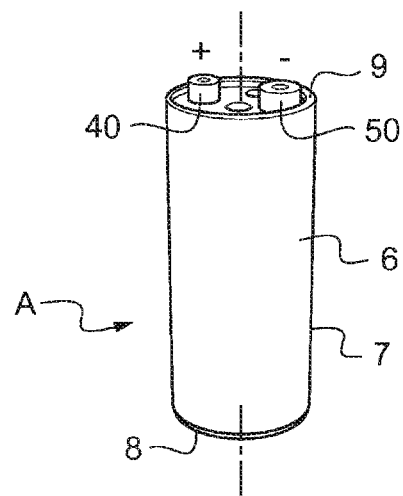

Fig.5'A

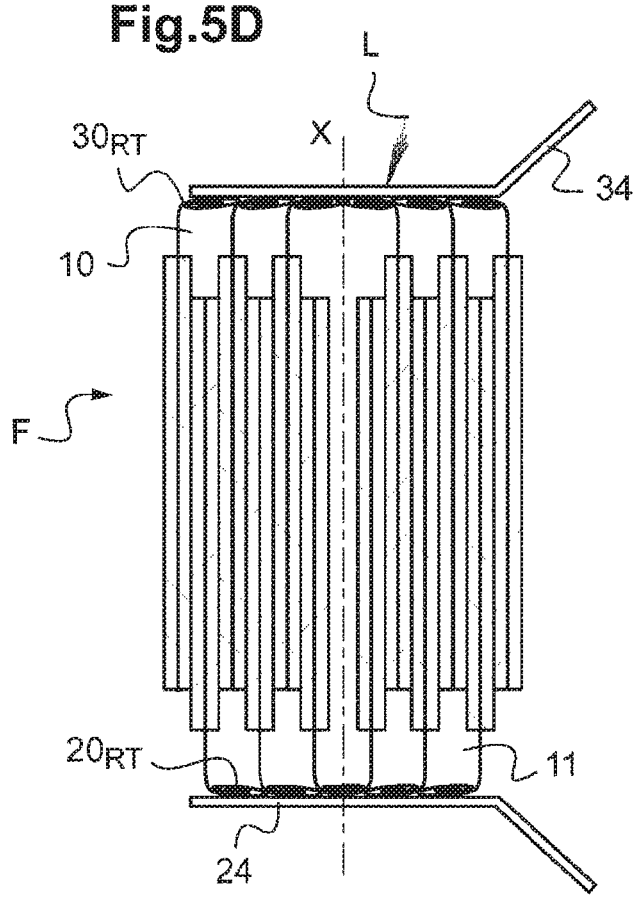
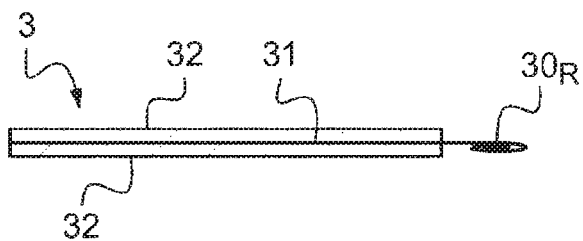
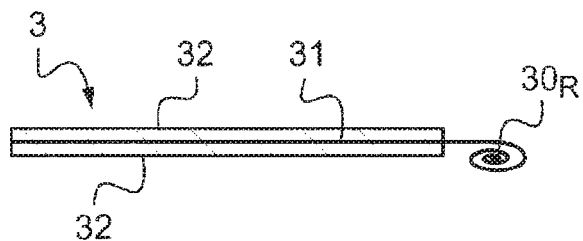

METHOD FOR PRODUCING AN ELECTROCHEMICAL BUNDLE FOR A METAL-ION ACCUMULATOR COMPRISING FOLDING OR COILING THE FOIL ENDS AROUND THEMSELVES

TECHNICAL FIELD

The present invention relates to the field of metal-ion electrochemical generators, which operate according to the principle of insertion or deinsertion, or in other words intercalation/deintercalation, of metal ions in at least one electrode.

More particularly it relates to a lithium electrochemical accumulator including at least one electrochemical cell consisting of an anode and a cathode on either side of a separator impregnated with electrolyte, two current collectors one of which is connected to the anode and the other to the cathode, and a casing of a shape that is elongate along a longitudinal axis (X), the casing being arranged to sealably house the electrochemical cell even though a portion of the current collectors forming output terminals, also referred to as poles, passes therethrough.

The separator may consist of one or more films.

The casing may include a cover and a container, usually referred to as a can, or include a cover, a bottom and a lateral jacket joined both to the bottom and to the cover.

The present invention aims to produce an electrical connection portion between at least one electrochemical cell of the accumulator and its output terminals integrated into its casing.

Although described with reference to a lithium-ion accumulator, the invention is applicable to any metal-ion electrochemical accumulator, i.e. also to sodium-ion accumulators, magnesium-ion accumulators, aluminum-ion accumulators, etc.

PRIOR ART

Such as schematically illustrated in FIGS. 1 and 2, a lithium-ion accumulator or battery usually includes at least one electrochemical cell C consisting of a separator impregnated with a constituent electrolyte 1 between a positive electrode or cathode 2 and a negative electrode or anode 3, a current collector 4 connected to the cathode 2 and a current collector 5 connected to the anode 3 and lastly, a packaging 6 arranged to sealably contain the electrochemical cell even though a portion of the current collectors 4, 5, forming the output terminals, passes therethrough.

The architecture of conventional lithium-ion batteries is an architecture that may be qualified monopolar, because with a single electrochemical cell including an anode, a cathode and an electrolyte. A number of types of monopolar architecture geometry are known:

- a cylindrical geometry such as disclosed in patent application U.S. 2006/0121348;
- a prismatic geometry such as disclosed in U.S. Pat. Nos. 7,348,098 and 7,338,733; and
- a stacked geometry such as disclosed in patent applications U.S. 2008/060189 and U.S. 2008/0057392 and U.S. Pat. No. 7,335,448.

The electrolyte constituent may be a solid, liquid or gel in the latter form, the constituent may comprise a separator made of a polymer or microporous composite imbibed with organic or liquid-ionic electrolytets) that allow(s) lithium ions to move from the cathode to the anode for a charge and vice versa for a discharge, thereby generating the current.

The electrolyte is in general a mixture of organic solvents, for example of carbonates, to which a lithium salt, typically LiPF6, is added.

The positive electrode or cathode consists of insertion materials of the lithium cation which are in general composites, such as lithium iron phosphate $LiFePO_4$, lithium cobalt oxide $LiCoO_2$, optionally substituted lithium manganese oxide $LiMn_2O_4$ or a material based on $LiNi_xMn_yCo_zO_2$ where x+y+z=1, such as $LiNi_{0.33}Mn_{0.33}Co_{0.33}O_2$, or a material based on $LiNi_xCo_yAl_zO_2$ where x+y+z=1, $LiMn_2O_4$, $LiNiMnCoO_2$ or lithium nickel cobalt aluminum oxide $LiNiCoAlO_2$.

The negative electrode or anode very often consists of carbon, graphite or is made of $Li_4Ti_5O_{12}$ (titanate material), though also optionally is based on silicon or based on lithium, or based on tin and alloys thereof or of a silicon-based composite.

The anode and the cathode made of lithium insertion material may be deposited using a conventional technique in the form of an active layer on a metal sheet forming a current collector.

The current collector connected to the positive electrode is in general made of aluminum.

The current collector connected to the negative electrode is in general made of copper, of nickel-coated copper or of aluminum.

Conventionally, a Li-ion accumulator or battery uses a pair of materials at the anode and at the cathode that allow it to operate at a high voltage level, typically about 3.6 volts.

A Li-ion accumulator or battery includes a rigid packaging or casing when the targeted applications are constraining or a long lifetime is sought, with for example very high pressures to be withstood and a requirement for a stricter seal-tightness level (typically lower than $10^{-6}$ mbar·l/s helium), or in highly constraining environments such as in the spatial or aeronautic field.

The main advantage of rigid packagings is thus that their high seal tightness is maintained over time because the casings are closed by welding, in general by laser welding.

The geometry of most rigid packaging casings of Li-ion accumulators is cylindrical, because most accumulator electrochemical cells are wound by spooling into a cylindrical geometry. Casings of prismatic shapes have also already been produced.

One of the types of cylindrically shaped rigid casings usually manufactured for high-capacity Li-ion accumulators of lifetime longer than 10 years is illustrated in, FIG. 3.

The casing 6, of longitudinal axis X, includes a cylindrical lateral jacket 7, a bottom 8 at one end, and a cover 9 at the other end. The cover 9 bears the terminals or poles 40, 50 through which the current is output. One of the output terminals (poles), for example the positive terminal 40, is welded to the cover 9, whereas the other output terminal, for example the negative terminal 50, passes through the cover 9 with interposition of a seal (not shown) that electrically insulates the negative terminal 50 from the cover.

FIGS. 4 to 4B show reproductions of photographs of an electrochemical bundle F of a shape that is elongate along a longitudinal axis X1, and including a single electrochemical cell C such as it usually is wound by spooling before the steps of housing in a casing and of electrical connection to the output terminals of the accumulator, and its impregnation with an electrolyte. The cell C consists of an anode 3 and a cathode 4 on either side of a separator (not shown) suitable for being impregnated with electrolyte. As may be seen, one 10 of its lateral ends of the bundle F is bounded by uncoated bands 30 of anode 3, whereas the other 11 of its lateral ends is bounded by uncoated bands 20 of cathode 2.

The expression "uncoated bands" is here and in the context of the invention understood to mean the portions of the metal sheets, also referred to as foils, forming the current collectors, that are not covered with a lithium insertion material.

The objective of manufacturers of accumulators is to increase the discharge time of a cell of the accumulator, or their aptitude to be able to operate in high-power regimes, while improving their lifetime, i.e. the number of times they may be cycled, their lightness and the cost of manufacturing these components.

Approaches to improving Li-ion accumulators mainly address the nature of the materials and the methods used to produce electrochemical-cell components.

Other less common possible approaches to improvement address the casings of accumulators and the methods and means used to electrically connect an electrochemical bundle to the two output terminals, also referred to as caps or even poles, of different polarity of the accumulator.

At the present time, when it is desired to produce a high-quality electrical connection between the electrochemical bundle and the output terminals of a Li-ion accumulator of cylindrical or prismatic geometry, it is sought to respect as best as possible the following design rules:

- meet the requirements of an application in terms of electrical conduction between each polarity of electrode and the output terminals integrated into the casing of the accumulator, for example with a view to responding to peaks in power while limiting heating inside the accumulator liable to accelerate its electrochemical aging;
- minimize the level of the overall internal resistance of the accumulator by making the electrical connection directly to the current collectors of the electrodes for each polarity and by, connecting an intermediate connection part between the electrochemical bundle and the casing of the accumulator;
- simplify the connection to the electrochemical bundle, by making the connection directly to the lateral uncoated electrode bands (also referred to as margins) bounding the two opposite lateral ends of the bundle, respectively;
- optimize the characteristics (thickness, height, weight) and profiles of the lateral uncoated electrode bands for making said electrical connection, in order to as best as possible meet the requirements of the final assembly steps, i.e. the steps of integration of the electrochemical bundle into the casing, of closing the casing of the accumulator, of filling with electrolyte, etc.; and
- minimize the mass and volume required to make the electrical connection which as such is not a generator of electrochemical energy, but that are necessary to transfer energy from the electrochemical bundle to the exterior of the accumulator casing.

Regarding the literature describing solutions for producing electrochemical bundles for accumulators of cylindrical or prismatic shape and the electrical connection thereof to output terminals integrated into the casings thereof, mention may be made of the following documents.

Patent application WO 2015/030541 discloses welding tabs to the uncoated bands of an electrochemical bundle.

Patent FR 2094491 discloses an alkaline accumulator the electrical connection of which between the wound electrochemical cell and output terminals is obtained by cutting regularly spaced slits in the margins of the electrodes, then radially folding the margins thus slit from the exterior of the interior, the margins then taking the form of superposed lamina forming a substantially flat plinth to which a current collector that, depending on the circumstances, may consist of the cover of the casing, is lastly welded.

Patent application EP 1102337 discloses a Li-ion accumulator the electrical connection of which between the wound electrochemical cell and output terminals is obtained by pressing once each end of the electrode foils of the wound cell, along the winding axis, by means of a pressing tool then, by laser welding of each end of the electrode layers to a terminal current collector consisting of a foil taking the form of a disk and a connecting tab itself subsequently laser welded to the cover of the casing, at one end, and to the casing bottom, at the other end. Ribs are produced each over a diameter of the disk and are themselves pressed before the welding against the pressed electrode foil ends.

Patent application EP 1596449 describes a Li-ion accumulator the electrical connection of which between the wound electrochemical cell and output terminals is obtained firstly by multiple pressing of each lateral end bounded by uncoated electrode bands of the wound cell, by means of a pressing tool of outside diameter comprised between 15 and 20 mm. The pressing tool moves over a very small distance alternatively from the exterior toward the interior of the cell parallel to the winding axis while travelling round the entire lateral area of the uncoated electrode bands in order to make the latter overlap and Ram a dense flat plinth to which is laser or transparency welded a terminal current collector consisting of a foil taking the form of a flat connection band itself laser or transparency welded subsequently to an output terminal integrated into the cover at one lateral end and to the casing bottom, at the other lateral end.

By analyzing all the known solutions for producing an electrochemical bundle of a lithium accumulator and its electrical connection to the output terminals of the accumulator, such as described above, the inventors came to the conclusion that said solutions were still perfectible in many ways.

Firstly, the weight and volume of the lateral uncoated electrode bands (margins) required for the electrical connection with the current collectors according to the prior art are not necessarily optimized, thereby implying that the weight and volume of the accumulator will in the end also not be optimized.

Next, the inventors observed that de facto the margins of a given lateral end were not necessarily electrically connected together, in particular those portions of these margins which are located in the most peripheral zone of the bundle. This implies a reduced actual specific capacity of the electrochemical bundle, this possibly being disadvantageous in particular for high-power applications of the accumulator.

Lastly, the step of filling a lithium accumulator electrochemical bundle with electrolyte may prove to be relatively long and tricky because the current collectors according to the prior art, such as they are welded to the accumulator electrochemical bundle margins, form a substantial obstacle to the passage of the electrolyte.

To mitigate these drawbacks, the applicant proposed in the patent application FR 3011128 A1 a new process for producing an electrochemical bundle, this process comprising a combination of two steps b/ and c/ of folding an electrochemical bundle, which steps were distinct in their implementation and allowed two distinct zones to be obtained on at least one, and preferably each, of the lateral ends of the bundle.

This process is particularly effective in terms of electrical conductivity and removal of heat from the bundle. However, its implementation may prove to be constraining in certain applications.

Thus, existing techniques for producing accumulator electrochemical bundles and their electrical connection to their output terminals and the drawbacks of such techniques may be classed into two categories:

forming the bundle by spooling then placing/welding tabs directly on the spooled bundle. This technique is relatively easy to implement, but ineffective in terms of electrical conductivity and removal of heat from the bundle;

forming the bundle by spooling then carrying out operations in order to tamp down/compact the spooled bundle. This technique, which consists in increasing the density of the uncoated lateral bands (margins) is effective in terms of electrical conductivity and removal of the heat from the bundle, but more complicated to implement.

There is therefore a need to improve the production of the electrochemical bundle of a lithium (and more generally metal-ion) accumulator and its electrical connection to the output terminals of the accumulator, especially with a view to simplifying its implementation while preserving a good performance in terms of electrical conductivity and removal of the heat from the bundle.

The aim of the invention is to at least partially meet this need.

SUMMARY OF THE INVENTION

To this end, the invention relates, under one of its aspects, to a process for producing an electrochemical bundle (F) of a metal-ion accumulator (A), such as a Li-ion accumulator, with a view to its electrical connection to the output terminals of the accumulator, including the following steps:

a/ folding or winding upon themselves one or more uncoated bands of the anode and/or cathode of at least one electrochemical cell that consists of the cathode and anode on either side of a separator suitable for being impregnated with an electrolyte, so as to form a zone of extra thickness at the end of the bands;

b/ winding upon itself by spooling the electrochemical cell until an electrochemical bundle having a shape that is elongate along a longitudinal axis X is formed with, at one of its lateral ends, uncoated bands of anode, and, at the other of its lateral ends, uncoated bands of cathode;

c/ compressing axially, along the X-axis, the bands of the electrochemical bundle, in at least one area comprising the zones of extra thickness at the end of the bands so as to obtain, in the compressed area portion, a substantially flat plinth that is intended to be welded to a current collector.

Thus, the process according to the invention is characterized by winding or folding upon itself margins of at least one of the two electrodes, then compacting by tamping in order to further density the wound margins with a view to welding with a current collector.

In this ray, compactness is easily achieved first locally (zones of extra thickness) at the electrode end then by compacting all of the zones of extra thickness into a metal mattress over a substantial portion or even the entirety of the area at the end of the bundle, thereby making it possible to achieve a high-quality weld of the positive and negative collectors in the zones thus prepared.

In other words, by combining local compacting then compacting of all of the zones already compacted locally (extra thicknesses), margins that are so to speak stratified into multilayers of metal foil are obtained.

The metal mattress obtained in this way is uniform over all the end area(s) of the electrochemical bundle.

The axial compression is a simple compacting operation carried out in one or more goes and which may be rapid.

The process according to the invention may be implemented with electrodes the metal foil of which is relatively thin or relatively thick in the case where the accumulator is intended for a power application.

Furthermore, according to the invention, with a high densification of the folded, then compressed band portions, it is possible to significantly increase the real specific capacity of the electrochemical bundle of an accumulator.

The process according to the invention is thus a very good compromise between the existing techniques of electrical connection by tabs, which have the advantage of being simple to implement, and the techniques for axially tamping down the electrochemical bundle, which allow a good performance to be obtained in terms of electrical conductivity and heat removal from the bundle.

The process is advantageously implemented to produce Li-ion batteries or accumulators.

According to a first variant, step a/ is carried out before step b/. Preferably, step a1 is then carried out during the cutting step, called "step of slitting" the electrodes.

According to a second variant, step a/ is carried out simultaneously to step IV. It is specified here that by "simultaneously" what is meant, in the context of the invention, is the fact that rather than adding additional processing steps to be managed, such as implementation in another machine, an existing piece of equipment for producing a metal-ion accumulator is merely modified by adding a station for folding or winding upon itself the end of the electrode. In addition, from the point of view of time, this step is carried out on the unwound zones of the electrodes, and therefore adds no additional time to the process, since it is a question of an identical length of time, for example corresponding to slitting of an electrode and rolling it on itself at the same time, or not.

Winding or folding margins during slitting of the electrodes or during spooling of the bundle is advantageous because this ensures the time required to produce the bundle is not increased with respect to the known technique. In other words, this time, which would otherwise be lost, is saved by parallel processing. In other words, this makes it possible to avoid having to manage any additional processing steps, such as implemented in another machine.

More particularly, for the first or second variant, it is possible to use a set of successive guides and rollers that allow the uncoated band (margin) of the electrode to be wound upon itself. The technique implemented may for example be that already used in the paper industry like book printing or the placement of folded sheets in envelopes for example.

Thus, the following steps may be continuously carried out in series in a piece of equipment for spooling the electrodes with their separator or in a piece of equipment for slitting the electrodes:

placing a spool of electrode in the piece of equipment;
unwinding the electrode in the piece of equipment;
in the zones in which the electrode is unwound, rolling of the end by means of guides and rollers;
winding of the electrode about an axis in case of slitting, or if not winding the electrode with the electrode of inverse polarity and their separator about an axis in order to form an electrochemical bundle;

implementing other conventional production steps of the process for manufacturing a metal-ion accumulator.

Advantageously the axial, compression in step c/ may be carried out on all the area of one lateral end of the bundle.

The axial compression in step c/ may be carried out in one or more goes.

Advantageously, the axial compression comprises a step of axial tamping. This axial tamping may be optional or be the step of axially compressing in its entirety. Thus, the tamping may be more or less pronounced, typically over a height comprised between 0.2 to 2 mm.

According to one advantageous embodiment, the process includes an additional step a1/, between step a/ and step b/, consisting in crushing the zones of extra thickness. The crushing may be carried out so as to achieve the least possible thickness of the metal foil, or any other suitable thickness. Thus, the zones of extra thickness are further densified.

Yet another subject of the invention is a process for producing a portion for electrical connection between an electrochemical bundle of a metal ion accumulator and one of the output terminals of the accumulator, including the following steps:

producing an electrochemical bundle using, the process described above;

welding the zones of extra thickness, preferably of each plinth obtained, to a current collector itself intended to be electrically connected or joined to an output terminal of the accumulator.

Advantageously, the step of welding a plinth to a current collector is carried out by laser welding.

Lastly, the invention relates to a metal-ion accumulator or battery including a casing including:

a bottom to which is welded one or more current collectors welded to the electrochemical bundle using the process described above; and a cover with a feedthrough forming an output terminal to which is welded the other of the current collectors welded to the electrochemical bundle using the process described above.

Preferably, for a Li-ion accumulator:

the material of the negative electrode(s) is chosen from the group including graphite, lithium, titanate oxide $Li_4TiO_5O_{12}$; or based on silicon or based on lithium, or based on tin and alloys thereof;

the material of the positive electrode(s) is chosen from the group including lithium iron phosphate $LiFePO_4$, lithium cobalt oxide $LiCoO_2$, optionally substituted lithium manganese oxide $LiMn_2O_4$ or a material based on $LiNi_xMn_yCo_zO_2$ where x+y+z=1, such as $LiNi_{0.33}Mn_{0.33}Co_{0.33}O_2$ or a material based on $LiNi_xCo_yAl_zO_2$ where x+y+z=1, $LiMn_2O_4$, $LiNiMnCoO_2$ or lithium nickel cobalt aluminum oxide $LiNiCoAlO_2$.

DETAILED DESCRIPTION

Other advantages and features of the invention will become more clearly apparent on reading the detailed description of examples of implementation of the invention, which nonlimiting description is given by way of illustration with reference to the following figures, in which:

FIG. 1 is an exploded schematic perspective view showing the various elements of a lithium-ion accumulator;

FIG. 2 is a front view showing a lithium-ion accumulator with its flexible packaging according to the prior art;

FIG. 3 is a perspective view of a lithium-ion accumulator according to the prior art with its rigid packaging consisting of a casing;

FIG. 6A is a schematic view of a first variant of a step of the process according to the invention, described with reference to FIGS. 5 to 5D; and FIG. 6'A is a schematic view of a second variant of a step of the process according to the invention, described with reference to FIGS. 5 to 5D.

It will be noted that elements that are the same in an accumulator according to the prior art and in an accumulator according to the invention have been referenced by the same references for the sake of clarity.

It will be noted that the various elements according to the invention are shown only for the sake of clarity and that they are not to scale.

FIGS. 1 to 4B have already been commented upon in detail in the preamble. They are therefore not described below.

To improve the electrical connection between an electrochemical bundle of a Li-ion accumulator and its output terminals, the inventors have developed a new process for producing the electrochemical bundle.

The metal foils bearing the electrode materials may have a thickness comprised between 5 and 50 μm. For an anode foil 3, it may advantageously be a question of a foil made of copper of thickness of about 12 μm. For a cathode foil 2, it may advantageously be a question of a foil made of aluminum of thickness of about 20 μm.

The various steps of this production process according to the invention will now be described with reference to FIGS. 5 to 5D.

It will be noted that the process is described fully for an anode 3. The process also applies in the same way to a cathode 2. It is also possible to choose to produce an electrochemical bundle F and its electrical-connection portion only to the anode 3 using the process according to the invention, the production and the portion connecting to the cathode 2 possibly being carried out/produced using an existing process, and vice versa.

Figure 5:
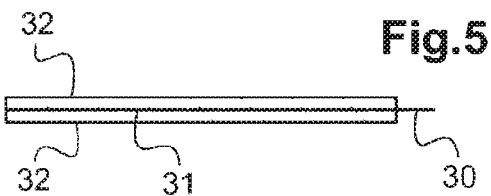
FIGS. 5 to 5D are schematic views showing the successive steps of an example according to the invention of a process for producing an electrochemical bundle and a portion for electrical connection thereof to the output terminals of the accumulator that it is integrated into, FIG. 5'A being a variant of FIG. 5A.

An anode 3 the metal foil of which bears, in its section 31, lithium insertion materials 32, whereas its lateral end band (margin) 30 is bare, i.e. devoid of lithium insertion materials, is started with (FIG. 5).

Figure 5A:
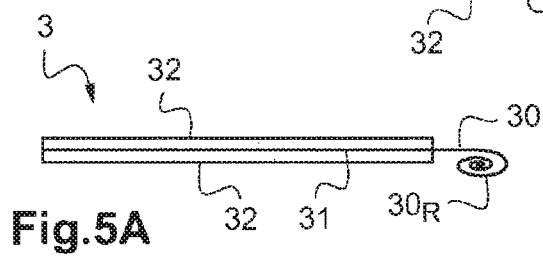

Step a/: The end of the margin 30 is wound upon itself in order to obtain a zone of extra thickness $30_R$ (FIG. 5A).

By way of variant, instead of winding it upon itself, the end of the margin 30 may be folded upon itself, still in order to obtain a zone of extra thickness $30_P$ (FIG. 5'A).

Step b/: The anode 3, the cathode 2 and at least one separator film of the electrochemical cell C are then wound around a holder (not shown).

Figure 4:
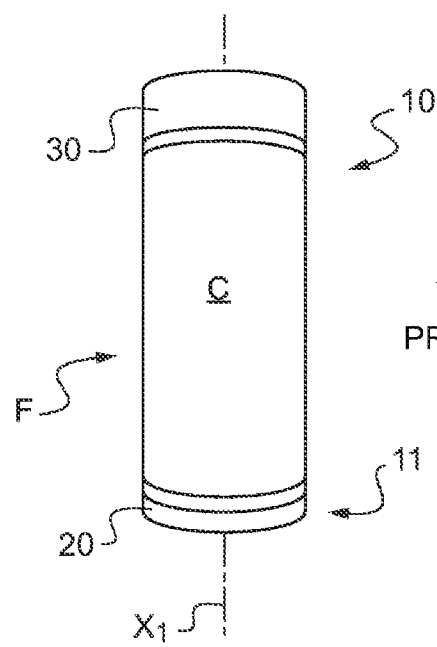
FIG. 4 is a perspective view of an electrochemical bundle of a lithium-ion accumulator according to the prior art, the bundle consisting of a single electrochemical cell wound upon itself by spooling.
Figure 4A:
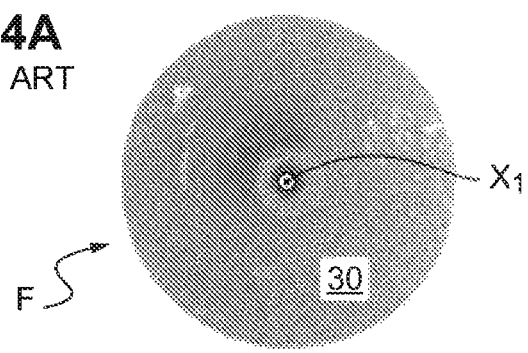
FIG. 4A is a photographic top view f one lateral end of the electrochemical bundle in FIG. 4.
Figure 4B:
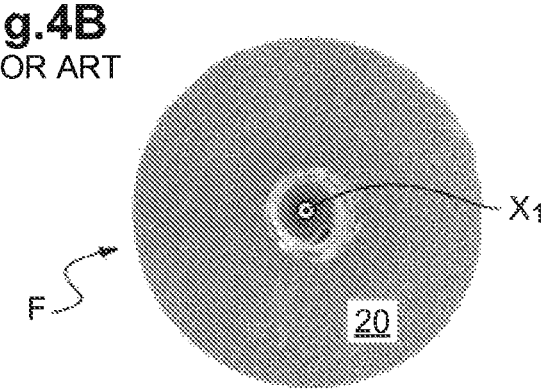
FIG. 4B is a photographic top view of the other lateral end of the electrochemical bundle in FIG. 4.
Figure 5B:
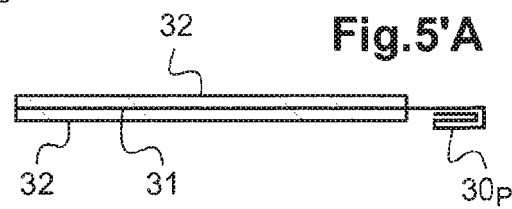
Figure 5B:
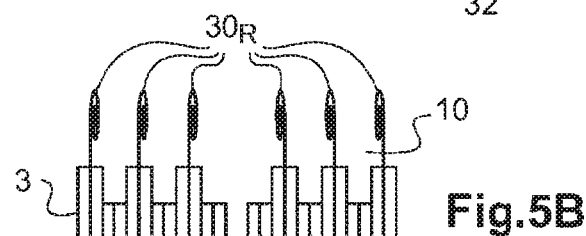
Figure 5B:
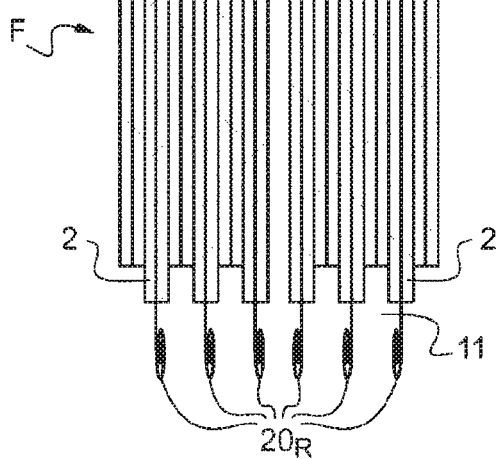

The bundle therefore has a cylindrical shape that is elongate along a longitudinal axis X, with, at one 10 of its lateral ends, uncoated bands 30 of anode 3, and, at the other 11 of its lateral ends, uncoated bands 20 of cathode. The initial bundle according to the invention is therefore such as shown in FIGS. 4 to 4B, with in addition, at the end of the margins 20, 30, zones of extra thickness $20_R$, $30_R$ (FIG. 5B).

Step c/: Axial tamping of the bands 20, 30 of the electrochemical bundle is then carried out, along the axis X, on all the area of the lateral ends 10, 11, and therefore on all the zones of extra thickness $20_R$, $30_R$.

The axial tamping consists in compression with a flat or structured tool the contact area of which is substantially equal to the area of each of the lateral ends of the bands 20 or 30.

When the desired geometry of the accumulator is cylindrical, the tool and the electrochemical bundle are arranged coaxially during the axial tamping.

The axial tamping is carried out in one or more goes. It may consist in a compression following one or more relative back-and-forth movements, i.e. at least one there-and-back trip along the axis X of the bundle, until either a sought-after bundle dimension along X is achieved, or a maximum compressive stress the value of which is preset beforehand.

Figure 5C:
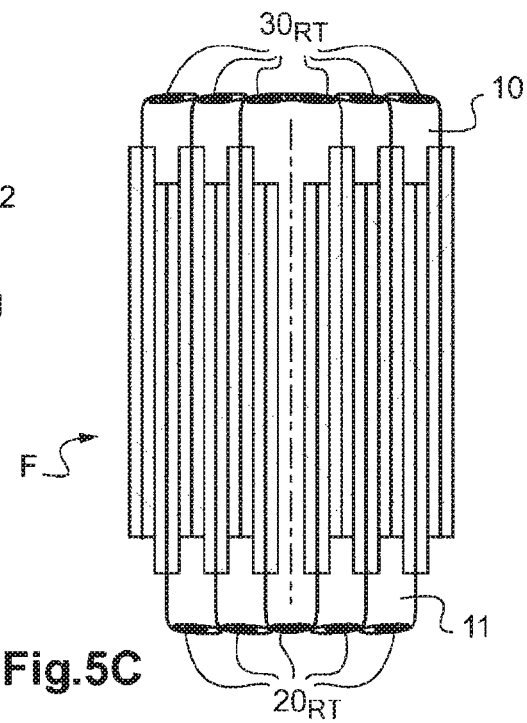

Thus, in the tamped area $20_{RT}$, $30_{RT}$, a substantially flat plinth that is intended to be welded to a current collector is obtained (FIG. 5C).

Thus, at this stage, not only has local compactness of the bands 20, 30 (margins) been achieved by creating zones of extra thickness $20_R$, $30_R$ but also overall compactness of all the surfaces of the end of the bundle F, via the axial tamping of the zones of extra thickness. The margins 20, 30 have thus been doubly densified into a compact mattress allowing a good laser weld to positive and negative collectors to be achieved in the zones thus prepared.

Step d/: at one 11 of the lateral ends of the bundle, the plinth formed by the tamped zones of extra thickness $20_{RT}$ of the cathode (positive margins) is then laser welded L to a conventional current collected 24 taking the form of a solid disc (FIG. 5D) itself intended to be subsequently welded to the bottom 8 of the accumulator casing 6.

At the other 10 of the lateral ends of the beam, the plinth formed by the tamped zone of extra thickness $20_{RT}$ of the anode (negative margins) is laser welded in the same way to a conventional current-collector portion 34 taking the form of a solid disc drilled in its center and a tab (not shown) that protrudes laterally from the disc (FIG. 5D), the tab itself being intended to be welded to the negative output terminal 50 that is mounted in such a way as to pass through the cover 9 of the accumulator casing.

Other variants and improvements may be made without however departing from the scope of the invention.

Thus, for example, once the anode 3 or cathode 2 has been wound or folded upon itself, provision may be made, before the step IV of forming the bundle by spooling, to crush the zones of extra thickness $20_R$, $30_R$, in order to further density these zones (FIG. 6A). It is also possible to skip this crushing (FIG. 6'A).

The invention is not limited to the examples described above; it is in particular possible to combine features of the illustrated examples together in variants, that have not been illustrated.

The invention claimed is:

1. A process for producing an electrochemical bundle of a lithium accumulator, with a view to its electrical connection to output terminals of the accumulator, the process comprising:
    a) folding or winding upon themselves one or more uncoated bands of an anode, a cathode, or both, of at least one electrochemical cell (C) comprising the cathode and the anode on either side of a separator suitable for being impregnated with an electrolyte, so as to form zones of extra thickness at the end of the uncoated bands;
    b) winding upon itself by spooling the at least one electrochemical cell until an electrochemical bundle having a shape that is elongate along a longitudinal axis X is formed with, at one of its lateral ends, uncoated bands of the anode, and, at the other of its lateral ends, uncoated bands of the cathode;
    c) compressing axially, along the X-axis, the uncoated bands of the anode and the cathode in the electrochemical bundle, in at least one area comprising the zones of extra thickness at the end of the bands so as to obtain, in the compressed area portion, a substantially flat plinth that is intended to be welded to a current collector.

2. The process for producing an electrochemical bundle as claimed in claim 1, wherein the folding or winding a) occurs before the winding upon itself b).

3. The process for producing a electrochemical bundle as claimed in claim 1, wherein the folding or winding a) occurs during cutting of the electrodes.

4. The process for producing an electrochemical bundle as claimed in claim 1, wherein the folding or winding a) occurs simultaneous with the winding upon itself b).

5. The process for producing an electrochemical bundle as claimed in claim 1, wherein the compressing axially c) occurs on all the area of one lateral end of the bundle.

6. The process for producing an electrochemical bundle as claimed in claim 1, comprising performing at least two of the compressing axially c).

7. The process for producing an electrochemical bundle as claimed in claim 1 wherein the compressing axially c) comprises axial tamping.

8. The process for producing an electrochemical bundle as claimed in claim L further comprising, between a) and b):
    a1) crushing the zones of extra thickness.

9. A process for producing a portion for electrical connection between an electrochemical bundle of a metal-ion accumulator and one of output terminals of the accumulator, the process comprising:
    producing an electrochemical bundle by the process of claim 1;
    welding the zones of extra thickness to a current collector intended to be electrically connected or joined to an output terminal of the accumulator.

10. The process for producing a portion for electrical connection as claimed in claim 9, wherein the welding to the current collector occurs by laser welding.

* * * * *